United States Patent
Ueda et al.

(10) Patent No.: US 6,806,974 B1
(45) Date of Patent: Oct. 19, 2004

(54) PRINT ORDER RECEIVING APPARATUS

(75) Inventors: Yutaka Ueda, Tokyo (JP); Hiroyuki Uemura, Tokyo (JP)

(73) Assignee: Konica Corporation, Tokyo (JP)

( * ) Notice: Subject to any disclaimer, the term of this patent is extended or adjusted under 35 U.S.C. 154(b) by 884 days.

(21) Appl. No.: 09/666,072

(22) Filed: Sep. 19, 2000

(30) Foreign Application Priority Data

Sep. 22, 1999 (JP) .......................................... 11-268201
Sep. 22, 1999 (JP) .......................................... 11-268203

(51) Int. Cl.[7] .............................................. G06K 15/00
(52) U.S. Cl. ..................................... 358/1.13; 358/1.1
(58) Field of Search ................................. 358/1.1, 1.12, 358/1.13, 1.14, 1.15, 1.18, 487, 527; 355/27, 40; 707/500, 505, 509, 517, 522, 523

(56) References Cited

U.S. PATENT DOCUMENTS

| | | | |
|---|---|---|---|
| 4,994,988 A | * 2/1991 | Yokoi | 358/1.13 |
| 5,666,215 A | 9/1997 | Fredlund et al. | |
| 6,272,293 B1 | * 8/2001 | Matama | 396/208 |
| 6,327,049 B1 | * 12/2001 | Ohtsuka | 358/1.18 |
| 6,331,903 B1 | * 12/2001 | Nakazawa et al. | 358/487 |
| 6,349,194 B1 | * 2/2002 | Nozaki et al. | 434/308 |
| 6,430,562 B1 | * 8/2002 | Kardos et al. | 707/10 |

FOREIGN PATENT DOCUMENTS

| | | |
|---|---|---|
| EP | 0 845 897 A2 | 6/1998 |
| EP | 0 856 972 A2 | 8/1998 |
| EP | 0 860 980 A2 | 8/1998 |

* cited by examiner

*Primary Examiner*—Gabriel Garcia
(74) *Attorney, Agent, or Firm*—Frishauf, Holtz, Goodman & Chick, P.C.

(57) ABSTRACT

A print order receiving apparatus includes a reader to read image data from a media in which the image data are stored; a producing section to produce information regarding a print order for an image based on the image data read by the reader and to confirm the print order by a confirming operation; a transmitting section to transmit the information regarding the print order produced by the producing section to an external image forming apparatus; and a selecting section capable of selecting one of a first mode and a second mode. In the first mode, the transmitting section transmits the information regarding the print order to the external image forming apparatus in response to the confirming operation at the producing section, and in the second mode, the transmitting section transmits the information-regarding the print order to the external image forming apparatus a predetermined time after the confirming operation was conducted at the producing section.

12 Claims, 6 Drawing Sheets

REGISTRATION NUMBER   00001

XXX PRINT SHOP ○○ STORE 0111-22-333,
△△ TOWN○○ CITY,
〒191-0056 TOKYO METROPOLIS

THANK YOU FOR YOUR PATRONAGE, SIR.

— D1

THE DATE OF ORDER: AUG. 25, 1999
THE RECEIPT NUMBER FOR A CUSTOMER: 00001
CUSTOMER NAME: YUTAKA UEDA
CUSTOMER'S PHONE NUMBER:00-2222-3333

— D2

CONTENTS OF YOUR ORDER ARE AS FOLLOWS.
DESIGN NUMBER: PSC001

| TYPE OF ORDER | PRINT SIZE | NUMBER OF PHOTOGRAPHS (NUMBER OF SETS) | UNIT PRICE |
|---|---|---|---|
| BASIC RATE | | | 700 |
| CHARGE FOR TECHNOLOGY | | | 1500 |
| POST CARD | KG | 20 | 60 |
| POSTAL CARD | | 20 | 80 |
| | | SUBTOTAL | 5000 |
| | | CONSUMPTION TAX | 140 |
| | | SUM TOTAL | 5140 |

— D3

THE DATE OF FINISH IS SHOWN BELOW.

| POST CARD | THE DAY FOLLOWING THE DATE OF ORDER |
|---|---|
| OTHER SERVICES | 3 DAYS AFTER THE DATE OF ORDER |

— D4

<u>PLEASE BE SURE TO BRING THIS RECIPT WHEN YOU RECEIVE PRINTS.</u>

PRINT ORDER RECEIVING APPARATUS

BACKGROUND OF THE INVENTION

The present invention relates to a print order receiving apparatus, and in particular, to a print order receiving apparatus which can receive print orders easily based on image data.

A digital camera which can convert optical images of a subject into digital image data to store them in a memory card has been developed, and it is already available on the market. Since the digital camera is usually provided with a liquid crystal panel for image display, it is possible to make the digital camera to display photographed images on the liquid crystal panel based on the image data stored.

Unlike silver halide photographs, images displayed on a liquid crystal panel of a digital camera are temporary ones which might disappear when a power source, for example, for the digital camera is turned off. Therefore, there is a problem that the display by the crystal panel is inappropriate when an image is appreciated for a long time. Further, there is an occasion to photograph a subject including plural people with a digital camera and to deliver the image to each of the plural people. There is a problem, in this case, that a person having no image-display means can not appreciate the image when the person receives a storage medium storing copied image data, although image data themselves can be copied on another storage medium.

On the contrary, it is possible to read image data stored in a storage medium into a personal computer to display them on a display means as an image or to make a print of the image through a printer connected to the personal computer. However, all the people trying to appreciate an image photographed by a digital camera can not always use a personal computer, because peripheral equipment for a personal computer and a printer are generally expensive. Therefore, there is a demand for a system wherein an image photographed by a digital camera can be appreciated in a simpler way.

For the problems stated above, there is an idea of a service to make a print from an image based on image data obtained through photographing by, for example, a digital camera. The service of this kind is one wherein a customer takes a storage medium (media) in which image data are stored to a photofinisher, then, a print is made from the image data to be handed to the customer in exchange for a charge in the photofinisher. The customer who utilizes this service can obtain prints simply in the same way as in silver halide photography without having any special equipment to make a print from an image.

When forming an image based on image data obtained through photographing by a digital camera, a simple equipment such as a general-purpose printer capable of being connected to a personal computer is not sufficient for obtaining high image quality equal to that in silver halide photography, and an image forming apparatus of higher accuracy is needed. Possibility for the image forming apparatus of this kind to be introduced widely in a short period of time is low, because the price of the image forming apparatus is relatively high presently. Therefore, before the image forming apparatus of this kind is introduced widely, the service to make prints from images obtained by a digital camera is considered to take a form wherein information including image data and contents of orders is received, through a print order receiving apparatus having a storage unit, from a customer at each of plural intermediation stores, for example, then, the information is sent to an image forming apparatus installed in a specific location so that prints may be made from desired images, and the prints are delivered to the customer through the intermediation store where the order was received.

In this case, when a print needs to be made by composing images of a post card or a calendar, for example, it is a problem to select a mode to give an order for prints. In such a case, in the case of an order for first cycle print for a silver halide film, a customer gives an order by imaging a final print form wherein images of a subject are synthesized, referring to a sample of a post card prepared in a intermediation store. On the other hand, since image data can be synthesized, it is preferable if it is possible for a customer to confirm an image (for example, an image of a subject processed to be a post card) based on image data after composition, when giving a print order in, for example, an intermediation store. However, composition of image data obtained through photographing by a digital camera having CCD of 2 million pixels or more, for example, requires a memory with considerable capacity, and the composition takes time. It is therefore difficult to conduct composition of image data for every order of prints.

It is further considered that some customers desire to compose handwritten images and characters, for example, with images of a subject, without using, or in addition to template images prepared in advance, for obtaining prints which display originality. However, it is a problem to select a mode to input such handwritten images and characters.

Further, when installing a print order receiving apparatus capable of inputting image data in an intermediation store, it is a problem to select a mode to transmit information for printing from the print order receiving apparatus to an image forming apparatus. In this case, it is preferable that information for printing can be transmitted through a simpler operation. Further, how to confirm the transmission of information is another problem.

In addition to the problems stated above, there is a problem that storage capacity is limited for a storage means which is needed for storing information relating to print orders before transmitting to an outer image forming apparatus, and thereby, unlimited storage is impossible.

SUMMARY OF THE INVENTION

In consideration of the problems of the prior art stated above, an object of the invention is to provide a print order receiving apparatus wherein print order processing for images obtained through photographing by a digital camera as an example, can be conducted more easily and efficiently.

The above object can be attained by the following structures.

(1-1) A print order receiving apparatus, comprises:

a reader to read image data from a media in which the image data are stored;

a producing section to produce information regarding a print order for an image based on the image data read by the reader and to confirm the print order by a confirming operation;

a transmitting section to transmit the information regarding the pint order produced by the producing section to an external image forming apparatus; and a selecting section capable of selecting one of a first mode and a second mode, wherein in the first mode, the transmitting section transmits the information regarding the pint order to the external image forming apparatus in respond to the confirming operation at the producing section, and in the second mode, the transmitting section transmits the information regarding the pint order to the external image forming apparatus a predetermined time after the confirming operation was conducted at the producing section.

(1-2) In the print order receiving apparatus of (1-1), the transmitting section correlates the image data read by the reader with the information regarding the print order produced by the producing section and transmits the image data together with the correlated information regarding the print order.

(1-3) In the print order receiving apparatus of (1-1), the predetermined time is a time when the information regarding the print order is accumulated by a predetermined amount.

(1-4) In the print order receiving apparatus of (1-1), the predetermined time is a time preset in a day.

(1-5) In the print order receiving apparatus of (1-1), the transmitting section transmits the information through a network to the external image forming apparatus.

(1-6) In the print order receiving apparatus of (1-1), the print order receiving apparatus further comprises
an output section to output at least a part of the information regarding the print order in response to the confirming operation at the producing section to an external printer so as to print the outputted information.

(1-7) In the print order receiving apparatus of (1-1), the external printer is a terminal equipment of a POS system.

(1-8) In the print order receiving apparatus of (1-2), the print order receiving apparatus further comprises:
an input section to input synthesizing information regarding an image synthesis,
wherein the external image forming apparatus synthesizes image data based on the image data and the synthesizing information and forms an image based on the synthesized image data.

(1-9) In the print order receiving apparatus of (1-1), the media is detachably mounted and the transmitting section comprises a first interface capable of transmitting the information regarding the print order through a network to the external image forming apparatus and a second interface capable of transmitting the information regarding the print order through a network to an external printer.

(1-10) In the print order receiving apparatus of (1-1), the producing section has a limiting condition on which the producing section is limited to produce further information regarding a print order when the an amount of the information stored in a memory becomes a predetermined amount or more.

(1-11) In the print order receiving apparatus of (1-10), at least a part of the memory is capable of being replaced with another memory and wherein when the part of the memory is replaced with another memory and the amount of the information stored in the memory becomes smaller than the predetermined amount, the producing section is released from the limiting condition.

(1-12) In the print order receiving apparatus of (1-9), the external printer has a print section of printing characters based on the information regarding the print order.

Further, the above object may be attained by the following preferable structures.

(Structure 2-1) A print order receiving apparatus having therein a reading means which reads image data from a medium in which image data are stored, a preparation means which prepares information relating to print order for images based on image data obtained through reading by the reading means, and an output means which outputs at least a part of the aforesaid information in response to operations for order confirmation, wherein the output means outputs at least a part of the information to an outer printer to make the printer to print and/or transmits at least a part of the information to an outer image forming apparatus to make it to form an image.

(Structure 2-2) The print order receiving apparatus according to Structure 2-1, wherein the output means transmits at least a part of the information to the aforesaid outer image forming apparatus through a network.

(Structure 2-3) The print order receiving apparatus according to Structure 2-1 or Structure 2-2, wherein information to be transmitted to the outer image forming apparatus includes aforesaid image data and order information.

(Structure 2-4) The print order receiving apparatus according to either one of Structure 2-1–Structure 2-3, wherein the output means transmits at least a part of the information to the outer printer through a network.

(Structure 2-5) The print order receiving apparatus according to Structure 2-4, wherein the outer printer is a terminal equipment of a POS system.

(Structure 2-6) A print order receiving apparatus having therein a reading means which reads image data from a medium in which image data are stored, a preparation means which prepares primary information including image data obtained through reading by the reading means, and an input means which inputs synthesizing information relating to composition of images, wherein image data are synthesized based on the primary information and the synthesizing information in an outer image forming apparatus, and thereby an image is formed based on the synthesized image data.

(Structure 2-7) The print order receiving apparatus according to Structure 2-6, wherein the synthesizing information includes information corresponding to image data to be synthesized in the outer image forming apparatus.

(Structure 2-8) The print order receiving apparatus according to Structure 2-7, wherein the image data to be synthesized are stored in the outer image forming apparatus and are specified based on the synthesizing information.

(Structure 2-9) The print order receiving apparatus according to either one of Structure 2-6–Structure 2-8, wherein the input means can download information corresponding to image data to be synthesized in the outer image forming apparatus through a network.

(Structure 2-10) The print order receiving apparatus according to either one of Structure 2-6–Structure 2-9, wherein the input means includes a display of a touch panel type, and image data inputted through the display are inputted as synthesizing information.

(Structure 2-11) The print order receiving apparatus according to Structure 2-10, wherein the input means has a character reading function which converts inputted image into a character, and character data corresponding to the converted characters are inputted as synthesizing information.

(Structure 2-12) The print order receiving apparatus according to Structure 2-11, wherein the synthesizing information includes information concerning a character font and a character size.

(Structure 2-13) The print order receiving apparatus according to either one of Structure 2-6–Structure 2-12, wherein the print order receiving apparatus has a display means which composes image data based on sub-information corresponding to the primary information and the synthesizing information, and displays an image based on the synthesized image data.

(Structure 2-14) The print order receiving apparatus according to Structure 2-13, wherein the sub-information is smaller in terms of volume than the primary information and the synthesizing information.

(Structure 2-15) A print order receiving apparatus having therein a reading means which reads image data from a medium in which image data are stored, a preparation means which prepares information about print order for images based on image data obtained through reading by the reading means, a transmission means which transmits the aforesaid information to an outer image forming apparatus, and a selection means which can select either one of the first mode in which the transmission means transmits the information in response to operations relating to order confirmation and the second mode in which the transmission means transmits the information at the prescribed timing, after the operations relating to order confirmation have been conducted.

(Structure 2-16) The print order receiving apparatus according to Structure 2-15, wherein the prescribed timing is a moment when prescribed amount of information concerning print order has been accumulated.

(Structure 2-17) The print order receiving apparatus according to Structure 2-15, wherein the prescribed timing is a moment which is a prescribed time.

(Structure 2-18) The print order receiving apparatus according to either one of Structure 2-15–Structure 2-17, wherein the transmission means the information to the outer image forming apparatus through a network.

(Structure 3-1) A print order receiving apparatus having therein a reading means which reads image data from a medium in which image data are stored, a preparation means which prepares information about print order for images based on image data obtained through reading by the reading means, a detachable storage means which stores information relating to the print order prepared by the preparation means, and an output means which outputs at least a part of information relating to the print order stored in the storage means, wherein the output means has at least one of the first interface capable of transferring at least a part of the aforesaid information to an outer image forming apparatus through a network and the second interface capable of transferring at least a part of the aforesaid information to an outer printer.

(Structure 3-2) The print order receiving apparatus according to Structure 3-1, wherein the first interface is a LAN terminal.

(Structure 3-3) The print order receiving apparatus according to Structure 3-1 or Structure 3-2, wherein the second interface is a serial communication terminal.

(Structure 3-4) The print order receiving apparatus according to either one of Structure 3-1–Structure 3-3, wherein the second interface is a USB terminal.

(Structure 3-5) The print order receiving apparatus according to either one of Structure 3-1–Structure 3-4, wherein the second interface is an infrared communication terminal. (Structure 3-6) The print order receiving apparatus according to either one of Structure 3-1–Structure 3-5, wherein there is provided a display means which displays that the output means has transferred at least a part of the information to an outer image forming apparatus through a network.

(Structure 3-7) The print order receiving apparatus according to Structure 3-6, wherein, when a signal relating to information receiving is sent from the outer image forming apparatus to which at least a part of the information has been transferred, the display means conducts the aforesaid display based on the signal.

(Structure 3-8) The print order receiving apparatus according to Structure 3-6 or Structure 3-7, wherein a display by the display means is conducted through the outer printer.

(Structure 3-9) The print order receiving apparatus according to either one of Structure 3-6–Structure 3-8, wherein a display by the display means is conducted through a display equipped on the print order receiving apparatus.

(Structure 3-10) The print order receiving apparatus according to either one of Structure 3-1–Structure 3-9, wherein there is provided a prohibiting means which prohibits installation and removal of the storage means when information prepared by the preparation means is being read into the storage means, or when at least a part of the information is being read out of the storage means.

(Structure 3-11) The print order receiving apparatus according to Structure 3-10, wherein the storage means is a PC card.

(Structure 3-12) A print order receiving apparatus having therein a reading means which reads image data from a medium in which image data are stored, a preparation means which prepares information about print order for images based on image data obtained through reading by the reading means, a storage means which stores information relating to the print order, and a limiting means which limits that the preparation means prepares the information, when the information stored in the storage means exceeds a prescribed amount.

(Structure 3-13) A print order receiving apparatus according to Structure 3-12, wherein there is provided a display means which displays that the preparation of the information by the preparation means has been limited by the limiting means.

(Structure 3-14) The print order receiving apparatus according to Structure 3-12 or Structure 3-13, wherein at least a part of the storage means is composed of a storage medium that is detachable from the print order receiving apparatus, and limitation by the limiting means is removed when the storage medium is replaced with a storage medium having therein stored information in a lesser amount.

A print order receiving apparatus of the invention is one having therein a reading means which reads image data from a medium in which image data are stored, a preparation means which prepares information about print order for images based on image data obtained through reading by the reading means, and an output means which outputs at least a part of the information in response to operations relating to order confirmation, wherein the output means outputs at least a part of the information to an outer printer to make it to print and/or transfers at least a part of the information to an outer image forming apparatus to make it to form an image. Therefore, an order for prints can be placed through simple operations, and for example, it is possible to install the print order receiving apparatus at an unmanned intermediation store so that a customer may place an order for prints through its operations.

Further, if the output means can transmit at least a part of the information to the outer image forming apparatus through a network, it is possible to save time and labor for storing the information in a medium such as CD, for example, and for taking the medium to a store, which is convenient.

Incidentally, it is preferable if the information transmitted to the outer image forming apparatus includes the image data and order information.

It is further preferable that the output means can transmit at least a part of the information to an outer printer representing a terminal equipment of a POS system through a network of the POS system.

A print order receiving apparatus of the invention is one having therein a reading means which reads image data from a medium in which image data are stored, a preparation means which prepares information including image data obtained through reading by the reading means, and an input means which inputs synthesizing information relating to composition of images, wherein image data are synthesized based on the primary information and the synthesizing information, and an image is formed based on the synthesized image data. Therefore, it is not necessary to compose image data on the part of the print order receiving apparatus, thereby, a period of time to handle an order can be shortened sharply, and a memory with great capacity required for composition does not need to be provided, resulting in the low cost structure.

In the case where the synthesizing information includes information corresponding to image data to be synthesized in the outer image forming apparatus, when composing images of a subject with detailed template images, if the number of the detailed template image stored on the part of the image forming apparatus is included in a part of the synthesizing information, it is possible to conduct composition on the part of the image forming apparatus based on the number mentioned above. Therefore, it is not necessary to transmit image data themselves relating to template images in great volume to the image forming apparatus side from the print order receiving apparatus side, a memory with great capacity is not needed and time of transmission can be shortened.

Namely, when the image data to be synthesized (for example, image data concerning detailed template images) are stored in the outer image forming apparatus, and the image data to be synthesized are specified based on the synthesizing information (for example, the number corresponding to the template image), an amount of information to be transmitted can be reduced sharply, resulting in a convenience.

When the input means is capable of downloading information corresponding to image data to be synthesized in the outer image forming apparatus through a network, it is possible, for template images taken in an image forming apparatus newly, for example, to input information including a sample image and the corresponding number at all times, which makes it possible to start service which follows the fashion quickly.

Furthermore, if the input means includes a display of a touch panel system, and if image data inputted through the display are arranged to be inputted as synthesizing information, when hand-written images are drawn on the display, for example, it is possible to transmit data of the image to the image forming apparatus side as synthesizing information, which makes it possible to print by composing the hand-written image with images of a subject.

When the input means has a character-reading function for converting the inputted images into characters, and character data corresponding to the converted characters are inputted as synthesizing information, it is possible to compose the hand-written characters with images of a subject in a form of a clean copy.

Incidentally, if the synthesizing information includes information concerning a font and a size of a character, the degree of freedom for character printing is broadened, which is preferable.

Further, if the print order receiving apparatus is provided with a display means which composes image data based on sub-information corresponding to the primary information and the synthesizing information and displays images based on the synthesized image data, it is possible to compose thumbnail images of subject images, for example, with template images wherein data are thinned, and to display on the display means. Therefore, processing time is short, a memory with large capacity is not needed, images can be synthesized on the part of the print order receiving apparatus, and a customer can confirm the final shape of the print, which is convenient.

Therefore, it is preferable that the sub-information includes data concerning a thumbnail image of an image of a subject, for example, and a template image wherein data are thinned, each being smaller in terms of volume than each of the primary information and the synthesizing information.

A print order receiving apparatus of the invention is one having therein a reading means which reads image data from a medium in which image data are stored, a preparation means which prepares information relating to an order for prints of images based on image data obtained through reading by the reading means, a transmission means which transmits the information to an outer image forming apparatus, and a selection means which can select either of the first mode wherein the transmission means transmits the information in response to operations of order confirmation and the second mode wherein the transmission means transmits the information at the prescribed time after implementation of the operations of order confirmation. It is therefore possible to realize higher efficiency in transmission in the following method. For example, the first mode is usually selected so that information may be transmitted in succession to operations of order confirmation, and for information in a large quantity requiring a relatively long transmission time, the second mode is selected so that the information may be stored in response to operations relating to order confirmation, and then, the information may be transmitted all together at a prescribed time such as a certain time in the night when the number of orders to be processed is small.

Incidentally, the prescribed time mentioned above may either be the moment when a prescribed quantity of information about print order has been accumulated, or be the moment of a prescribed time.

Further, it is preferable that the transmission means transmits the information to the outer image forming apparatus through a network such as an internet.

A print order receiving apparatus of the invention is one having therein a reading means which reads image data from a medium in which image data are stored, a preparation means which prepares information relating to an order for prints of images based on image data obtained through reading by the reading means, a detachable storage means which stores information about the print order prepared by the preparation means, and an output means which outputs at least a part of the information about the print order stored in the storage means, wherein the output means has at least one of the first interface capable of transmitting at least a part of the information to an outer image forming apparatus through a network and the second interface capable of transmitting at least a part of the information to an outer printer. Therefore, it is possible to use a detachable PC card as a storage means in place of a hard disk of a print order receiving apparatus, and thereby it is possible to replace the PC card immediately when it is filled with the stored information, which is convenient. Further, it is possible to transmit at least a part of information stored in the storage means to an outer image forming apparatus through the first interface by responding to operations for order confirmation and thereby to form an image print, and it is possible to transmit at least a part of information stored in the storage means to an outer printer through the second interface and thereby to print a duplicate, which makes it easy to deal with orders.

Incidentally, it is preferable that the first interface is a LAN terminal, and the second interface is an infrared communication terminal such as a serial communication terminal, USB terminal, or IrDA.

If there is provided a display means which displays that the output means has transmitted at least a part of the information to an outer image forming apparatus through a network, it is possible to confirm that information has been sent from the print order receiving apparatus side, by observing the display, which is convenient.

When signals relating to information receiving are sent to the display means from the outer image forming apparatus to which at least a part of the information has been transmitted, if the display is conducted based on the signals, it is possible to confirm that information has been received on the part of the outer image forming apparatus, by observing the display, which is more convenient.

Furthermore, if the display by the display means is conducted through a print by the outer printer, such print remains as a duplicate, which is convenient. If the display by the display means is conducted through a display provided on the print order receiving apparatus, it is possible to confirm in a simpler way.

Further, by providing a prohibition means which prohibits removal and installation of the storage means when reading the information prepared by the preparation means into the storage means, or when reading at least a part of the information out of the storage means, it is possible to prevent damage of the storage means or of the stored image caused by installing or removing the storage means by mistake when reading in or reading out information.

Though it is preferable that the storage means is a PC card, the invention is not limited to this.

A print order receiving apparatus of the invention is one having therein a reading means which reads image data from a medium in which image data are stored, a preparation means which prepares information relating to an order for prints of images based on image data obtained through reading by the reading means, a storage means which stores information about the print order, and a limiting means which limits that the preparation means prepares the information when a quantity of the information stored in the storage means exceeds a prescribed quantity. Therefore, when a room of the storage means is small for further print orders, for example, it is possible to make an operator to recognize that no further orders can be receiveed, and thereby to urge the operator to take necessary actions, thus a pause of ordering is eliminated, resulting in a user-friendly structure.

Incidentally, it is convenient if there is provided a display means which displays that the limiting means has limited preparation of the information conducted by the preparation means.

When at least a part of the storage means is composed of a storage medium detachable from the print order receiving apparatus, and when the storage medium is replaced with a storage medium having less amount of information stored, if limitation by the limiting means is canceled, then, when a PC card is used as a storage means, for example, the PC card which is filled is replaced with a vacant PC card, making it possible to receive further orders, which is convenient.

DETAILED DESCRIPTION OF THE PREFERRED EMBODIMENT

Figure 1:
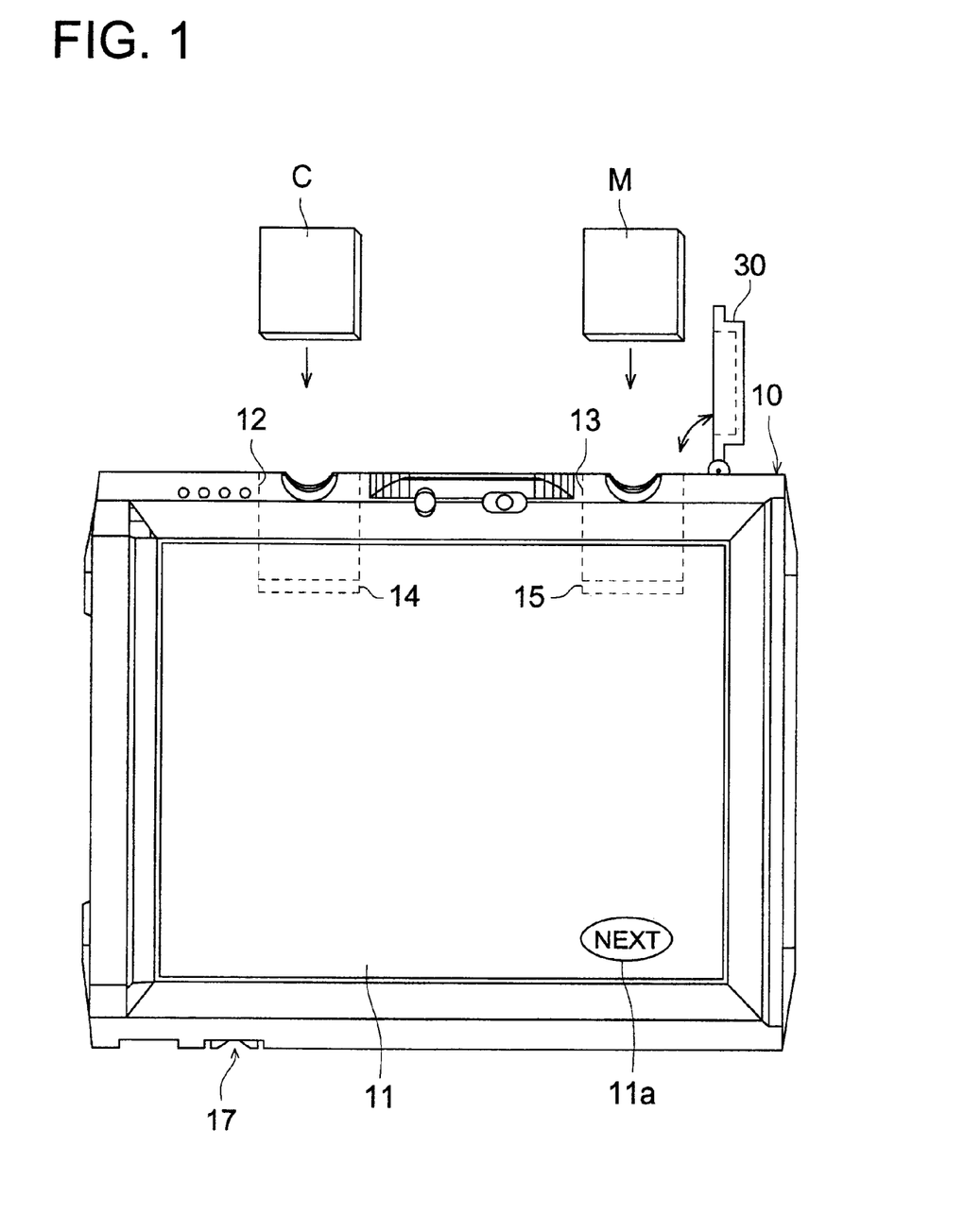
FIG. 1 is a top view of a print order receiving apparatus related to the first embodiment.

The invention will be explained as follows, referring to the embodiment. FIG. 1 is a top view of a print order receiving apparatus related to the first embodiment. In FIG. 1, print order receiving apparatus 10 is in a shape of a rectangular plate, and it has, on its top surface, an input means and liquid crystal image plane 11 of a touch panel type representing a display means, and has, on its side (bottom side in FIG. 1), power supply switch 17. Further, on the opposite side (upper side in FIG. 1) of the print order receiving apparatus 10, there are formed two openings 12 and 13. In the openings 12 and 13, there are respectively formed data reading unit (reading-out means) 14 and reading/writing unit 15.

The opening 12 is capable of receiving freely removable medium C wherein image data corresponding to images obtained through photographing by a digital camera are stored such as, for example, a PC card, while, the opening 13 is capable of receiving freely removable medium M representing a storage means or a storage medium, such as a PC card. It is preferable that the removable medium M is greater than the removable medium C in terms of storage capacity in the case of no stored data, namely, in the case of empty state. Incidentally, removable media C and M are not limited to PC card and IC card. Outside the opening 13, there is arranged cover member 30 which can freely move between a closing position to close the opening 13 and an opening position to open it.

Figure 2:
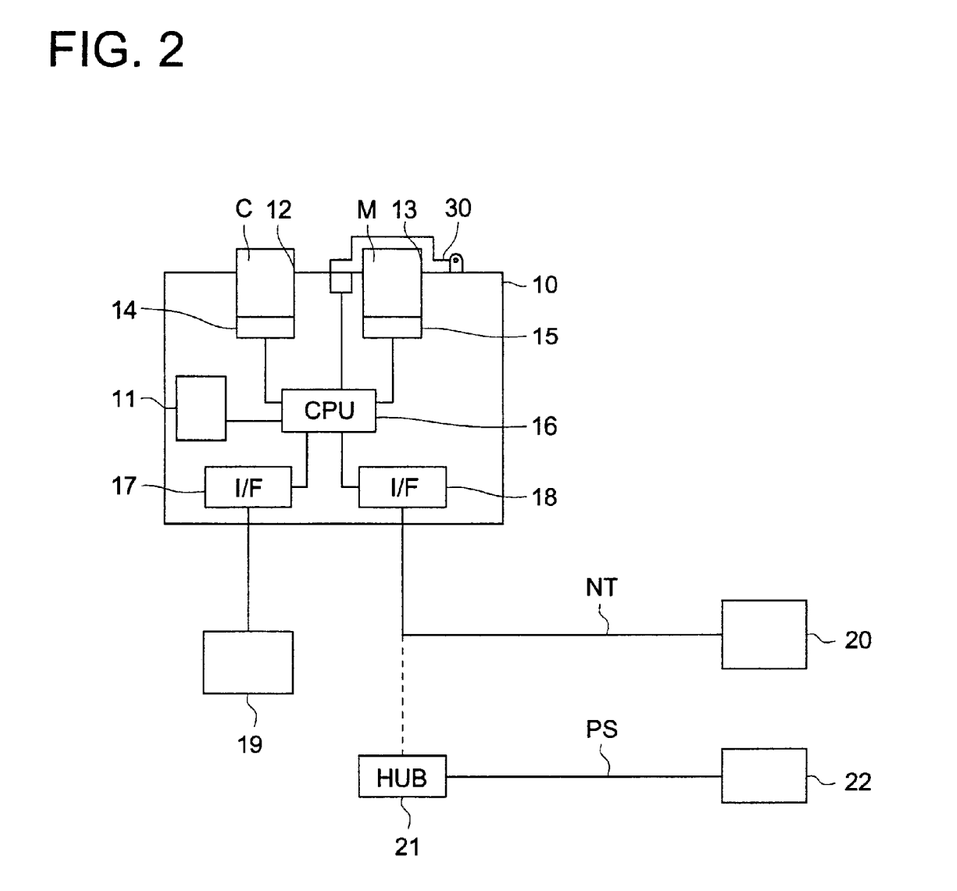
FIG. 2 is a diagram illustrating operations of a print order receiving apparatus related to the present embodiment.

FIG. 2 is a diagram illustrating operations of print order receiving apparatus 10 related to the present embodiment. In FIG. 2, print order receiving apparatus 10 has therein reading unit 14 capable of reading image data from removable medium C inserted in the opening 12, reading/writing unit 15 capable of making image data and print order information stated later to be stored in removable medium M inserted in the opening 13 and CPU 16 connected to the aforesaid units. The CPU 16 can input prescribed information from liquid crystal image plane 11 of a touch panel type, and can display prescribed images on liquid crystal image plane 11 through an unillustrated driver.

The print order receiving apparatus 10 has RS-232C and interface of a USB type (second interface) 17 which make it possible to communicate between CPU 16 and outer printer 19, and interface (for example, LAN terminal) 18 which makes it possible to communicate between CPU 16 and outer image forming apparatus 20 through internet NT. Incidentally, interface (first-interface) 18 may include a dial-up router. CPU 16 and interfaces 17 and 18 constitute an output means.

CPU 16 is connected, to be controllable, with lock member 31 for locking under the condition that cover member 30 is in the closed position. The lock member 31 representing a prohibition means may be one which locks cover member 30 by moving electromagnetically a hook-shaped member (not shown), for example, based on control signals of CPU 16, but the invention is not limited to this. Further, the CPU 16 may be connected to terminal equipment 22 through a network such as POS system from HUB 21 in place of an internet.

Specifications of print order receiving apparatus 10 related to the present embodiment will be explained as follows.

| | |
|---|---|
| CPU: | VR 4310 (167 MHz) or VR 5432 (167 MHz) |
| Memory: | SDRM, 64 Mbyte |
| | Flash, 28 Mbyte |
| Display: | LCD equipped with 12.1 inch TFT color LCD panel |
| | VRAM of a type of UMA system (using main memory) |
| | Resolution/number of colors . . . 600 x 800 |
| | 65, 536 colors (16 bit) display |
| | LED equipped with 4 pieces of 2-color (red/green) LEDs |
| | Operation section: Touch panel represented by an analog touch panel of a resistance membrane type |
| | Electrolytic power, 10 bit (1024 x 1024) |
| | General purpose switch, right and left Up/Down |
| Clock: | Year, month, hour, minute and second and 114 byte general purpose SRAM |
| | Lithium battery + backup by super-capacitor |
| Outer interface: | PCMCIA equipped with two Type II slots |
| | Serial equipped with two D-sub9pin connectors |
| | USB equipped with one USB connector |
| | IrDA equipped with one IrDA transmitting and receiving module |
| | 10BASE-T equipped with one 10BASE-T connector |
| Power source: | Power source to be supplied, DC19V to be supplied from AC adaptor |
| | Power consumption, 40 W or less |
| | Outer dimensions: 252 mm x 316.7 mm x 30 mm |
| Weight: | 1600 g (excluding AC adaptor) |

Figure 3:
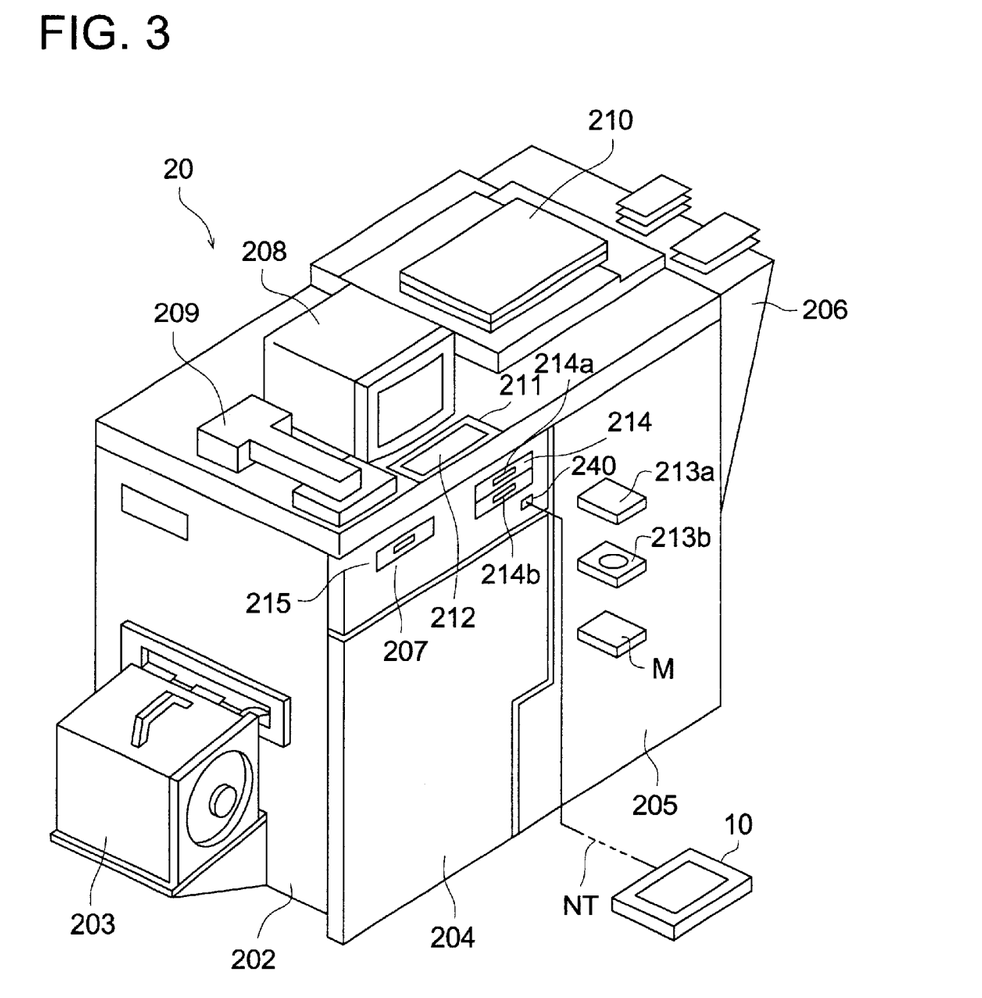
FIG. 3 is a perspective view of a print making apparatus (image forming apparatus) related to the present embodiment.

FIG. 3 is a perspective view of a print making apparatus (image forming apparatus) related to the present embodiment. As an example of the image forming apparatus in this case, there is illustrated print making apparatus 20 wherein a print is made by exposing a light-sensitive material to light and developing it. However, the invention is not limited to this, and print making apparatuses of an ink jet system and of an electrophotographic system may also be included in the invention, and those of a system to employ a light-sensitive material are especially preferable in the invention.

Print making apparatus 20 in the present embodiment is equipped, on its left side of main body 202, with magazine loading section 203. Inside the main body 202, there are provided exposure processing section 204 for exposing a light-sensitive material representing a storage medium and print making section 205 which develops the exposed light-sensitive material and dries it to make a print, and a print thus made is ejected onto tray 206 provided on the right side of main body 202. In the main body 202, there is further provided control section 207 at the upper position of exposure processing section 204.

On the upper position of the main body 202, there is arranged CRT 208 that constitutes a display means which displays on an image plane an image of image information from which a print is supposed to be made. On the left side of CRT 208, there is arranged film scanner section 209 representing an image reading section which reads a transmission type document, while, on the right side, there is arranged reflection type document inputting unit 210.

A document to be read at film scanner section 209 or at reflection type document inputting unit 210 is represented by a photographic light-sensitive material which includes a color negative film, a color reversal film, a black and white film and a black and white reversal film, and image data obtained through photographing by an analog camera are stored in the photographic light-sensitive material. It is possible to convert into digital information by a film scanner of film scanner section 209 and thereby to generate image data. When the photographic light-sensitive material is a color photographic paper, a flat bed scanner of reflection type document inputting unit 210 can be used to generate image data.

Image transmission section 214 is provided at a position of control section 207 of main body 202. In addition to the aforesaid removable medium M (IC card), PC card 213a and floppy disk 213b both storing image data can be inserted in the image transmission section 214, and image data of the inserted storage medium are read out.

On the front side of CRT 208, there is arranged operation section 211 which is provided with information inputting means 212 that is composed, for example, of a touch panel.

On the main body 202, there is provided storage medium writing section 215 which is provided with writing means K (FIG. 4) which writes image data in a storage medium into a magnetic storage medium or into a light storage medium when making a print by outputting image data from a removable medium having image data.

As a storage medium for storing image data, there are actually given removable media such as a multi-media card, memory stick, MD and CD-ROM to which the invention is not limited.

Incidentally, though operation section 211, CRT 208, film scanner section 209, reflection type document inputting unit 210, image transmission section 214 and storage media writing section 215 are provided solidly on the main body 202 to be the structure of the apparatus, one or more of them may also be provided separately.

Figure 4:
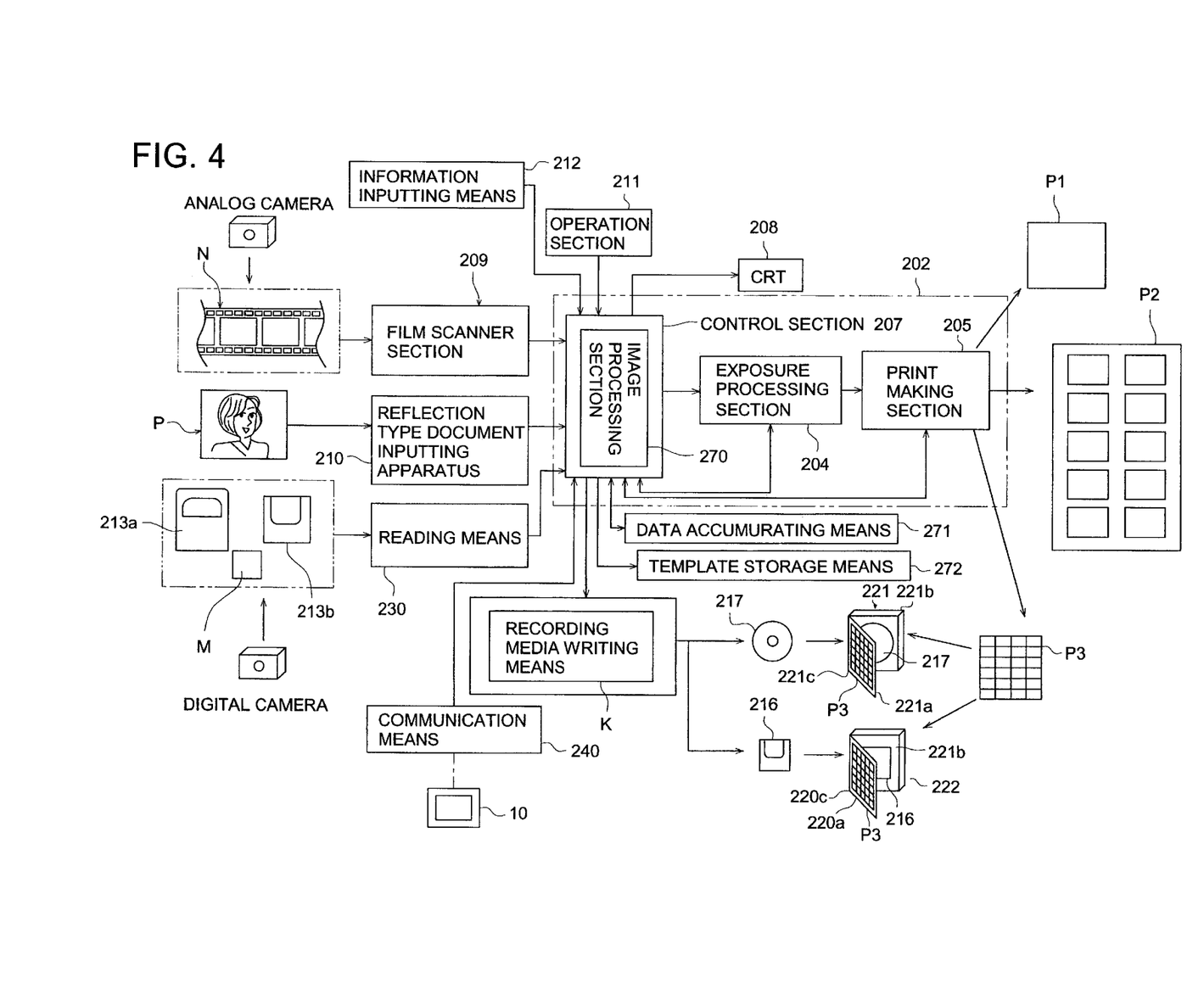
FIG. 4 is a block diagram showing the structure of the print making apparatus.

FIG. 4 is a block diagram showing the structure of a print making apparatus.

Control section 207 of print making apparatus 20 conducts reading of document information from film scanner section 209 or from reflection type document inputting unit 210, based on command information from information inputting means 212, and obtains image information to display on CRT 208.

Print making apparatus 20 has therein data accumulation means 271 and template storage means 272. It is possible to store image data read from removable medium M and print order information corresponding to the image data (information about how many prints from which frame and information about print size, which will be described in detail later) to accumulate them in succession. From film scanner section 209, there is inputted frame images coming from developed negative film N obtained through development of a negative film subjected to photographing by an analog camera, while, from reflection type document inputting unit 210, there is inputted frame images coming from print P obtained by printing frame images on a photographic paper and by developing and processing it.

In template storage means 272, there are stored in advance data of at least one template image for setting an area for composition with a background image and data related to the number corresponding to the aforesaid data. Due to operations of an operator or based on the number of the template image included in information of print order, a prescribed template image is specified from plural template images stored in the template storage means 272 in advance, then, image data are synthesized by the selected template image, and a print is made based on the synthesized image data. This composition by the template image is conducted by the known chromakey method.

Control section 207 has image processing section 270 which conducts image processing for image information to form exposure-use image information, and sends it exposure processing section 204. In the exposure processing section 204, a light-sensitive material is subjected to imagewise exposure, then, the light-sensitive material is sent to print making section 205 where a print is made by developing and processing the light-sensitive material exposed to light in the print making section 205 and by drying it.

Image transmission section 214 of the print making apparatus 20 is provided with reading means 230 which reads image data of removable medium M for transmission and with communication means 240 capable of communicating with print order receiving apparatus 10. The reading means 230 reads stored image data from removable medium M inserted in image transmission section 214, and it can transmit to control section 207 composed of a microcomputer. On the other hand, communication means 240 communicates with print order receiving apparatus 10 through internet NT to make inputting of image data to be possible.

On the print making apparatus 20, it is possible to conduct ordinary print P1, file print P2 and index print P3, based on image data stored in removable medium M and on print order information stored to correspond the image data mentioned above.

In ordinary print P1, a sheet of print is made by a piece of image data. In this ordinary print P1, it is possible to set a prescribed synthesizing area on a background image (template image) having some fixed patterns, for example, so that one frame image may be stored to be synthesized in the synthesizing area stated above, and to make print P1 in an ordinary print size decorated by a photo-frame. By storing a piece of image data in one sheet of print P1, it is possible to make a postcard and a calendar, for example, or specific prints with a taste which can be put in a purse or a container for a commuter's ticket.

File print P2 is one wherein one sheet of large-sized file is made by plural frame images. Even in the case of the file print P2, it is also possible to set synthesizing areas at 3–10 locations, for example, on the background image having prescribed patterns so that a frame image may be synthesized with each of these three synthesizing areas to be stored. Further, in the file print P2, perforated lines may be stored in the background, and the perforated lines make it possible to prepare specific prints with a taste which can be put in a purse or a container for a commuter's ticket, by making the specific prints to be cut easily and nicely.

Index print P3 is one wherein each of all images is shown to be in a prescribed size on one sheet of print so that it may be convenient for the next print order.

In the print making apparatus, to make a print of an image of the developed negative film or of the developed reversal film, films are to be s canned by a film scanner of film scanner section 209 to convert into digital information, and a print can be made in the same way through control section 207.

Next, operations of a print order receiving apparatus relating to the present embodiment will be explained as follows, referring to FIGS. 1 and 2. It is preferable that print order receiving apparatus 10 relating to the present embodiment is installed in an intermediation store for prints or a convenience store (hereinafter referred to as an intermediation store) which does not own an image forming apparatus capable of forming an image highly accurately based on image data. A customer who desires prints takes removable medium C storing image data corresponding to images obtained through photographing by a digital camera of the customer to the intermediation store. Incidentally, as a removable medium, any types are receivable provided that a recording medium is capable of storing image data and is conveyable. Further, operations concerning print order are assumed to be conducted by a customer itself in the present embodiment, although they may be conducted by a worker at an intermediation store.

In the case of placing an order for prints, when a customer turns on power supply switch 17 of print order receiving apparatus 10, CPU 16 representing a preparation means which prepares order information is initialized to be under the condition that it can operate, and an initial image plane is displayed on liquid crystal image plane 11.

In this case, if the customer inserts removable medium C representing a removable medium into opening 12 of the print order receiving apparatus 10, an unillustrated sensor detects that the removable medium C has been fixed at the position where image data can be read, and sends signals which indicate that reading is possible. In response to these signals which indicate that reading is possible, reading unit 12 reads out image data stored in removable medium C. CPU 16 first makes image data thus read out to be stored in removable medium M, and further, the CPU 16 can display all images corresponding to the image data stored in removable medium C on one image plane of liquid crystal image plane 11 on an index manner, based on the image data thus read out.

Incidentally, when cover member 30 is opened, CPU 16 makes display 11 to display "Close the cover member" to urge the customer or a clerk to close cover member 30. After the cover member 30 is closed, CPU 16 writes image data, and in the course of the writing, lock member 31 is operated to prohibit opening of the cover member 30, so that accidental removal or attaching of removable medium M during writing may be prevented.

Incidentally, when full-size image data and thumbnail image data whose data quantity is smaller than that for full-size image data are stored in removable medium C for the same image, images are indicated based on thumbnail image data in the index indication. When image data whose data quantity is small are not stored, an index can be displayed by generating image data whose data quantity is small from full-size image data which have been read out.

A customer who observes this display selects an image for which the customer desires a print by pressing an image plane of liquid crystal image plane 11. In such a case, with regard to the image pressed on the liquid crystal image plane 11, if CPU 16 changes a color of its frame, for example, the selected image can be identified at a glance, which is convenient.

Figure 5:
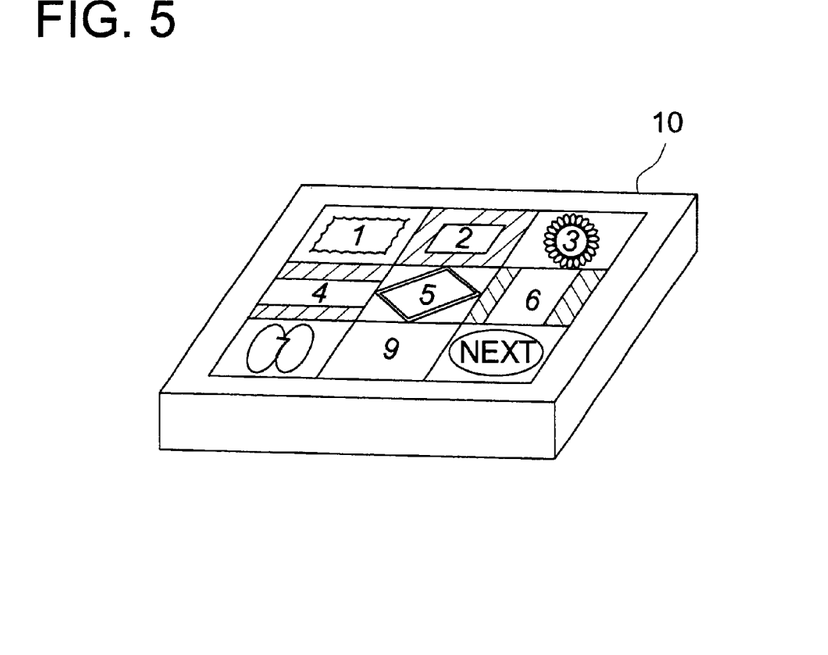
FIG. 5 is an example of a display mode of liquid crystal image plane 11.

After completion of the selection, if the customer presses "NEXT" button 11a (see FIG. 5) shown at the lower portion on the right side of the liquid crystal image plane 11, CPU 16 displays a stored template image (hereinafter referred to as thinned-out image data representing those from which the image data relating to detailed template images are thinned out) and its corresponding number on an index basis, as shown in FIG. 5. The customer who observes this display selects the template image to be synthesized with an image of the subject by pressing an image plane of the liquid crystal image plane 11. In such a case, with regard to the image pressed on the liquid crystal image plane 11, if CPU 16 changes a color of its frame, for example, the selected image can be identified at a glance, which is convenient. Incidentally, when the customer does not wish to compose, the customer has only to press the number 9 which indicates that no composition is carried out.

Figure 6:
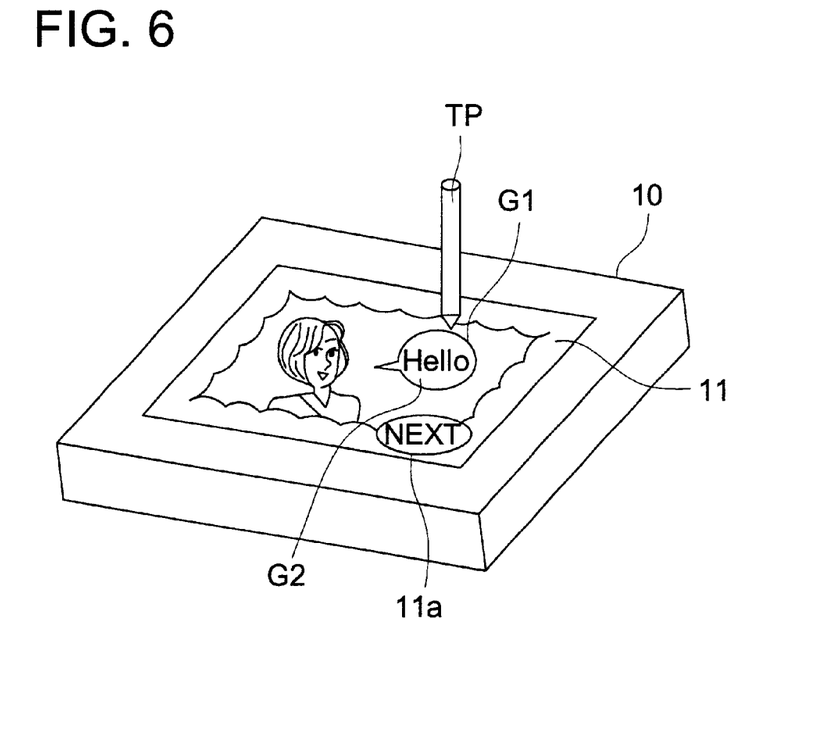
FIG. 6 is an example of a display mode of liquid crystal image plane 11.

After completion of the selection, if the customer presses "NEXT" button 11a shown at the lower portion on the right side of the liquid crystal image plane 11, CPU 16 composes thumbnail image data for an image of the subject with the thinned-out image data, and displays synthesized images on the liquid crystal image plane 11 as shown in FIG. 6 based on the synthesized data. In this case, however, time required for composition is short and the composition does not require large memory, because a volume of each data representing sub-information is small.

In this case, a user can handwrite images G1 and G2 of desired colors and shapes on the liquid crystal image plane 11 by using touch pen TP if necessary. Handwritten images G1 and G2 are inputted into CPU 16 through a touch panel type to be displayed on the liquid crystal image plane 11. In this case, CPU 16 can convert image G2 into character data by using OCR functions and can even display them. The OCR functions will not be described in detail here because they are well-known.

On the liquid crystal image plane 11, therefore, the synthesized image is displayed to be of the shape in which the print is made finally by image forming apparatus 20. Therefore, the customer can confirm the state of finish at a glance, and it is possible to make a print which can satisfy user's desire more. At the stage of completing ordering operations for images for desired prints by doing the same operations, the liquid crystal image plane 11 displays contents of the order (not shown) for confirmation. Thus, the user who does not wish to change the order presses NEXT button. la as a confirmation operation.

When the button 11a is pressed, CPU 16 representing an output means judges that operations to confirm print order have been completed, and conducts the following operations. First, CPU 16 makes removable medium M to store all information about the order. Namely, the removable disk M is used as a hard disk.

CPU 16 conducts writing or reading of image data, and in the course of the writing or reading, CPU 16 makes lock member 31 to operate to prohibit opening of cover member 30, so that accidental removal or mounting of removable medium M may be prevented.

Figure 7:
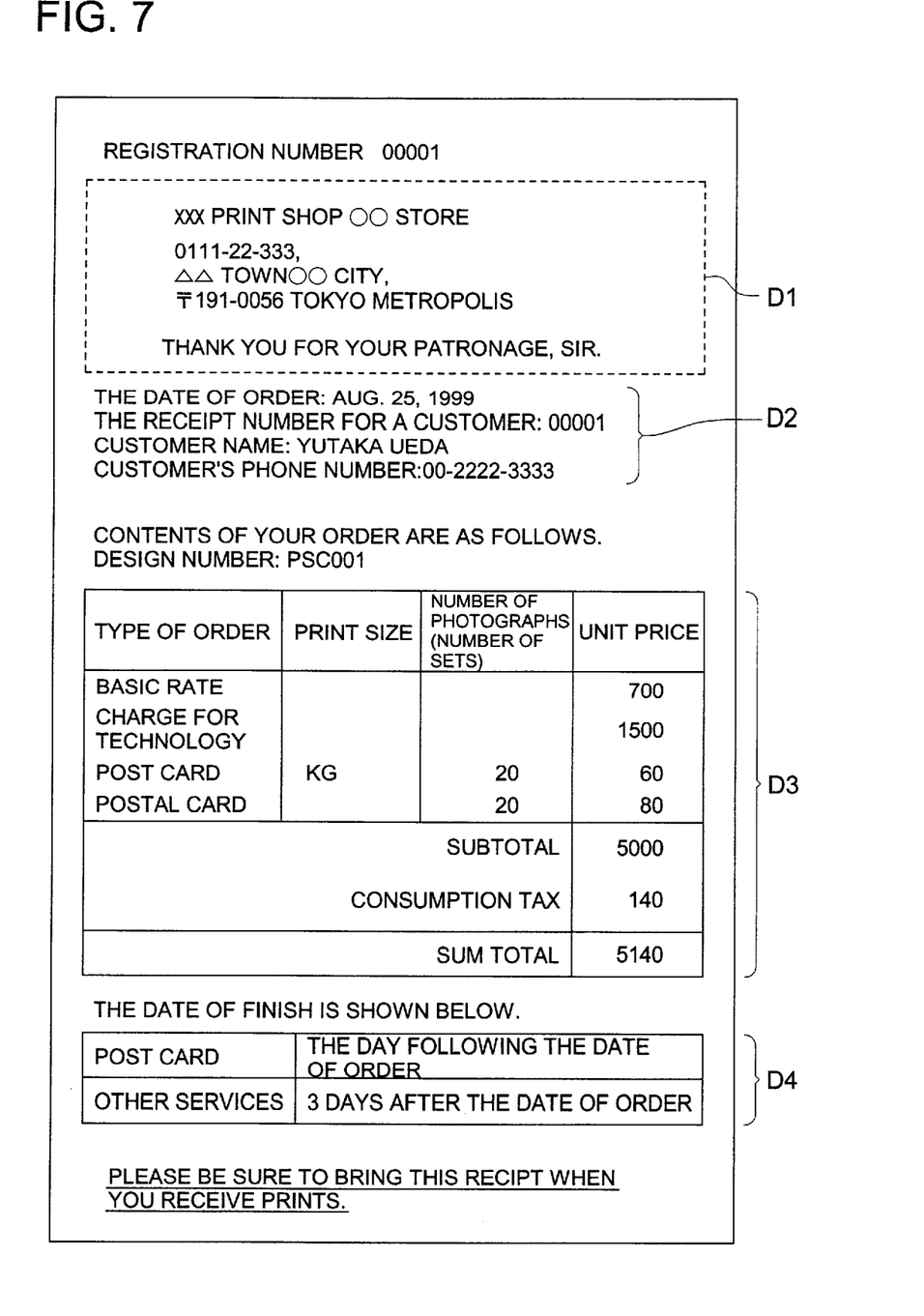
FIG. 7 is an example of a duplicate of print order.

Further, CPU 16 reads out a part of information relating to the order from removable medium M under the state that inner processing memory is empty, then transmits data to printer 19 through interface 17 (or to terminal equipment 22 of POS system through interface 18, and makes a duplicate for order shown in FIG. 7 to be printed. In the order duplicate stated above, there are described information (the store name, address and telephone number) D1 relating to an intermediation store, information (the date of ordering, receipt number, name and telephone number) D2 relating to a customer, information D3 relating to the detailed charges for prints, and information D4 relating to the date of finish. It is further possible to form a rough synthesized image on the order duplicate, based on composition data for thumbnail image data for images of a subject and thinned-out image data. The order duplicate of this kind is taken back to home by a customer, and when prints are finished later, it is taken to the store to be exchanged for prints together with fixed charges. Incidentally, printer 19 can also output a duplicate of the intermediation store and a duplicate on the part of an image forming apparatus 20.

Further, CPU 16 communicates with image forming apparatus 20 through interface 18 and internet NT, and transmits information necessary for the print which has been read out from removable medium M. Information necessary for the print in this case includes main information composed of image raw data, the number and composition position of a template image to be synthesized, image data relating to handwritten images G1 and G2 (or character data including a font and a size), synthesizing information composed of composition position of a text form and a magnification rate, and order information concerning the number of prints. Namely, on the part of print order receiving apparatus 10, image raw data and detailed template image data are not composed, and thereby, time for the composition is not necessary, a memory with large capacity for the composition is not needed, and communication time is shortened to reduce communication cost.

Experiments conducted by the present inventors have cleared that image data of a full-size image obtained through photographing by a digital camera having CCD of about 2 million pixels have a volume of about 1 MB, and therefore, when composing the image data with detailed template image, even a postcard size requires a memory of about 7 MB. On the contrary, in the present embodiment, a memory with a capacity of a little over 1 MB makes it possible to transmit data for prints, which makes it possible to provide a lower cost print order receiving apparatus.

When data necessary for prints have been transmitted to outer image forming apparatus 20, CPU 16 can make display 11 to display "UNDER TRANSMISSION OF PRINT ORDER". Or, CPU 16 may also make an outer printer to print the same message through interface 17.

The image forming apparatus 20 into which the data mentioned above are inputted through communication means 240 sends signals relating to notification of reception to the print order receiving apparatus 10 which conducted transmission. In response to this, CPU 16 can also make display 11 to indicate "TRANSMISSION OF PRINT ORDER COMPLETED". Or, CPU 16 may also make an outer printer to print the same message through interface 17. A customer who observes this message can learn that transmission of order has been completed, which is convenient.

The image forming apparatus 20 into which the data mentioned above are inputted through communication means 240 has therein stored detailed template image data. Therefore, the image forming apparatus 20 conducts composition with image raw data, based on the transmitted number and composition position, and it further conducts composition with image data relating to handwritten images. Though the composition of image data is considered to take a relatively long time, automatic operations at night, for example, can be used for execution of processing.

Prints outputted from image forming apparatus 20 are transported to an intermediation store to be handed to a customer finally.

Incidentally, in the present embodiment, when button 11a is pressed, CPU 16 makes both printer 19 and image forming apparatus 20 to print for simplification of operations, by judging that print order has been confirmed. However, it is also possible to make printer 19 only to operate or to make image forming apparatus 20 only to operate, by providing an unillustrated selection means.

Further, the print order receiving apparatus 10 can conduct down load of thinned-out image data of new template image data and their corresponding numbers from image forming apparatus 20 through interface 18 and internet NT, and it can it can additionally display template images on liquid crystal image plane 11 in the mode shown in FIG. 5, based on the thinned-out image data.

Incidentally, due to the natural disaster, there may be the occasion wherein information can not be transmitted through internet NT for the reason that communication lines are suspended, or the lines are jammed, or there may be the occasion wherein it is inappropriate to transmit information through internet NT. It is therefore considered that removable medium M is used in place of HDD. Namely, if all pieces of information necessary for prints are stored in removable medium M, and if this removable medium M is conveyed to image forming apparatus 20, reading means 230 may read information from the removable medium M to make desired prints.

On the other hand, capacity for storage in removable medium M is limited, and therefore, it is impossible to store information needed for prints without limitation. It is therefore considered to eliminate from the removable medium the information necessary for prints transmitted to outer image forming apparatus 20. However, when transmission through internet NT is impossible for the reason of the natural disaster as stated above, there is a fear that a large quantity of information are accumulated in removable medium M.

Therefore, when CPU 16 representing a limiting means detects that information in prescribed quantity or more are accumulated in removable medium M, display 11 is made to display warning of "NO FURTHER PRINT ORDER MAY BE ACCEPTED DUE TO INSUFFICIENT STORAGE CAPACITY. REPLACE A STORAGE MEDIUM." and further receipt of print order thereafter is restricted. Due to this, it is possible to prevent troubles that there occurs a pause in receipt of print order. If a clerk replaces the removable medium M with a vacant one in response to the message mentioned above, CPU 16 erases the message of display 11 and cancel the restriction of order receipt, thus receipt of print order can be resumed. Incidentally, the prescribed quantity means an amount less than capacity to store information for one time print order, but the invention is not limited to this. Further, LED flashing or oral warning may also be conducted in place of the warning display or in addition to the warning display.

On the other hand, in print order receiving apparatus 10, when button 11a is pressed, CPU 16 makes image forming apparatus 20 to transmit information for prints, by judging that print order has been confirmed. However, when internet lines are jammed, for example, there sometimes is an occasion where it is inappropriate to start transmission immediately.

Therefore, as a variation of the present embodiment, CPU 16 serving also as a selection means can transmit information efficiently, in accordance with an amount of information to be transmitted, by starting transmission of information by interlocking with pressing of button 11a when the information amount is relatively small (first mode), and by accumulating information momentarily in removable medium M by interlocking with pressing of button 11a when the information amount is relatively large and by starting transmission at the prescribed timing when internet lines are free, based on a built-in timer (second mode). Incidentally, although transmission of information was started by interlocking with pressing of button 11a, when communication with image forming apparatus 20 is failed, it is also possible to store information to be transmitted in removable medium M momentarily and to redial after a prescribed period of time. By storing information to be transmitted in removable medium M momentarily, it is possible for CPU 16 to receive new print order even before the second transmission, which is a merit. If information transmission is completed before redialing, information in removable medium M may be erased.

When orders in prescribed (information) quantity, for example, are accumulated, as an occasion other than the foregoing, it is considered that CPU 16 conducts transmission of these pieces of information at a time. Due to this, it is possible to avoid repetition of transmission for the period of time that is shorter than a prescribed time when transmitting by using telephone lines requiring basic charges up to the prescribed time period, and thereby to achieve reduction of communication expenses. By arranging the structure stated above, even when handling image data wherein an amount of data is much larger than other information, it is possible to conduct smooth processing with reduced cost.

The invention has been explained above, referring to embodiments, but the invention should not be construed to be limited to the above embodiments, and it is naturally possible to modify and improve according to circumstances. For example, liquid crystal image plane 11 of print order receiving apparatus 10 does not need to be limited to a touch up system, and it is possible to provide an input unit such as a key-board or a mouse separately, and thereby to input information through this input unit.

A print order receiving apparatus of the present embodiment is one having therein a reading means which reads image data from a medium wherein image data are stored, a preparation means which prepares primary information including image data obtained through reading by the reading means, an output means which outputs at least a part of the aforesaid information in response to operations concerning order confirmation, wherein the output means outputs at least a part of the aforesaid information to an outer printer to make it to print and/or transmits at least a part of the aforesaid information to an outer image forming apparatus to make it to form an image. Therefore, it is possible to place print orders through simpler operations, and to install the print order receiving apparatus in an unmanned intermediation store, for example, so that print orders may be placed through customer's operations.

A print order receiving apparatus of the present embodiment is one having therein a reading means which reads image data from a medium wherein image data are stored, a preparation means which prepares primary information including image data obtained through reading by the reading means, and an input means which inputs synthesizing information concerning image composition, wherein image data are synthesized based on the primary information and the synthesizing information and an image is formed based on the synthesized image data in an outer image forming apparatus. Therefore, composition of image data does not need to be conducted on the part of the print order receiving apparatus, and thereby, the processing time for orders can be shortened sharply, and a memory with a large capacity which is necessary for composition does not need to be provided, resulting in the low cost structure.

A print order receiving apparatus of the present embodiment is one having therein a reading means which reads image data from a medium in which image data are stored, a preparation means which prepares information relating to an order for prints of images based on image data obtained through reading by the reading means, a transmission means which transmits the information to an outer image forming apparatus, and a selection means which can select either of the first mode wherein the transmission means transmits the information in response to operations concerning order confirmation and the second mode wherein the transmission means transmits the information at prescribed timing after implementation of the operations concerning order confirmation. It is therefore possible to realize higher efficiency in transmission in the following method. For example, the first mode is usually selected so that information may be transmitted in succession to operations of order confirmation, and for information in a large quantity requiring a relatively long transmission time, the second mode is selected so that the information may be stored in response to operations relating to order confirmation, and then, may be transmitted all together at a prescribed time such as a certain time in the night when the number of orders to be processed is small.

A print order receiving apparatus of the present embodiment is one having therein a reading means which reads image data from a medium in which image data are stored, a preparation means which prepares information relating to an order for prints of images based on image data obtained through reading by the reading means, a detachable storage means which stores information about the print order prepared by the preparation means, and an output means which outputs at least a part of the information about the print order stored in the storage means, wherein the output means has at least one of the first interface capable of transmitting at least a part of the information to an outer image forming apparatus through a network and the second interface capable of transmitting at least a part of the information to an outer printer. Therefore, it is possible to use a detachable PC card as a storage means in place of a hard disk of a print order receiving apparatus, and thereby it is possible to replace the PC card immediately when it is filled with the stored information, which is convenient. Further, it is possible to transmit at least a part of information stored in the storage means to an outer image forming apparatus through the first interface by responding to operations for order confirmation and thereby to form an image print, and it is possible to transmit at least a part of information stored in the storage means to an outer printer through the second interface and thereby to print a duplicate, which makes it easy to deal with orders.

A print order receiving apparatus of the present embodiment is one having therein a reading means which reads image data from a medium in which image data are stored, a preparation means which prepares information relating to an order for prints of images based on image data obtained through reading by the reading means, a storage means which stores information about the print order, and a limiting means which limits that the preparation means prepares the information when a quantity of the information stored in the storage means exceeds a prescribed quantity. Therefore, when a room of the storage means is small for further print orders, for example, it is possible to make an operator to recognize that no further orders can be received, and thereby to urge the operator to take necessary actions, thus a pause of ordering is eliminated, resulting in a user-friendly structure.

What is claimed is:

1. A print order receiving apparatus, comprising:
   a reader to read image data from a media in which the image data are stored;
   a producing section to produce information regarding a print order for an image based on the image data read by the reader and to confirm the print order by a confirming operation;
   a transmitting section to transmit the information regarding the print order produced by the producing section to an external image forming apparatus; and
   a selecting section capable of selecting one of a first mode and a second mode, wherein in the first mode, the transmitting section transmits the information regarding the print order to the external image forming apparatus in response to the confirming operation at the producing section, and in the second mode, the transmitting section transmits the information regarding the print order to the external image forming apparatus a predetermined time after the confirming operation was conducted at the producing section.

2. The print order receiving apparatus of claim 1, wherein the transmitting section correlates the image data read by the reader with the information regarding the print order produced by the producing section and transmits the image data together with the correlated information regarding the print order.

3. The print order receiving apparatus of claim 1, wherein the predetermined time is a time when the information regarding the print order is accumulated by a predetermined amount.

4. The print order receiving apparatus of claim 1, wherein the predetermined time is a time preset in a day.

5. The print order receiving apparatus of claim 1, wherein the transmitting section transmits the information through a network to the external image forming apparatus.

6. The print order receiving apparatus of claim 1, further comprising:
   an output section to output at least a part of the information regarding the print order in response to the confirming operation at the producing section to an external printer so as to print the outputted information.

7. The print order receiving apparatus of claim 1, wherein the external printer comprises a terminal equipment of a POS system.

8. The print order receiving apparatus of claim 2, further comprising:
   an input section to input synthesizing information regarding an image synthesis, and
   wherein the external image forming apparatus synthesizes image data based on the image data and the synthesizing information and forms an image based on the synthesized image data.

9. The print order receiving apparatus of claim 1, wherein the media is detachably mounted and the transmitting section comprises a first interface capable of transmitting the information regarding the print order through a network to the external image forming apparatus and a second interface capable of transmitting the information regarding the print order through a network to an external printer.

10. The print order receiving apparatus of claim 1, wherein the producing section has a limiting condition on which the producing section is limited to produce further information regarding a print order when the an amount of the information stored in a memory becomes a predetermined amount or more.

11. The print order receiving apparatus of claim 10, wherein at least a part of the memory is capable of being replaced with another memory and wherein when the part of the memory is replaced with another memory and the amount of the information stored in the memory becomes smaller than the predetermined amount, the producing section is released from the limiting condition.

12. The print order receiving apparatus of claim 9, wherein the external printer comprises a print section of printing characters based on the information regarding the print order.

* * * * *